United States Patent [19]

Kasson

[11] Patent Number: 5,450,216

[45] Date of Patent: Sep. 12, 1995

[54] COLOR IMAGE GAMUT-MAPPING SYSTEM WITH CHROMA ENHANCEMENT AT HUMAN-INSENSITIVE SPATIAL FREQUENCIES

[75] Inventor: James M. Kasson, Menlo Park, Calif.

[73] Assignee: International Business Machines Corporation, Armonk, N.Y.

[21] Appl. No.: 289,976

[22] Filed: Aug. 12, 1994

[51] Int. Cl.$^6$ .............................................. H04N 1/60
[52] U.S. Cl. .................... 358/518; 358/519; 358/520; 345/154; 345/199; 382/167
[58] Field of Search ............... 358/518, 519, 520, 504, 358/521; 345/154, 199; 382/167

[56] References Cited

U.S. PATENT DOCUMENTS

| | | |
|---|---|---|
| 4,670,780 | 6/1987 | McManus et al. |
| 4,721,951 | 1/1988 | Holler . |
| 4,751,535 | 6/1988 | Myers . |
| 4,812,902 | 3/1989 | Fuchsberger . |
| 4,812,903 | 3/1989 | Wagensonner et al. |
| 4,825,297 | 4/1989 | Fuchsberger et al. |
| 4,831,434 | 5/1989 | Fuchsberger . |
| 4,839,721 | 6/1989 | Abdulwahab et al. |
| 4,879,595 | 11/1989 | Niki et al. |
| 4,933,754 | 6/1990 | Reed et al. |
| 4,941,038 | 7/1990 | Walowit . |
| 5,012,333 | 4/1991 | Lee et al. |
| 5,107,332 | 4/1992 | Chan . |
| 5,138,303 | 8/1992 | Rupel . |
| 5,185,661 | 2/1993 | Ng . |

FOREIGN PATENT DOCUMENTS

| | | |
|---|---|---|
| 3-158075 | 7/1991 | Japan . |
| 3-224072 | 10/1991 | Japan . |
| 4-260121 | 9/1992 | Japan . |

OTHER PUBLICATIONS

Michael Davidson, "Perturbation Approach to Spatial Brightness Interaction in Human Vision", Journal of the Optical Society of America, vol. 58, No. 9, Sep. 1968, pp. 1300–1308.

Gerard J. C. van der Horst et al., "Transfer of Spatial Chromaticity-Contrast at Threshold in the Human Eye", Journal of the Optical Society of America, vol. 57, No. 10, Oct. 1967, pp. 1260–1266.

R. S. Gentile et al., "A Comparison of Techniques for Color Gamut Mismatch Compensation", Journal of Imaging Technology, vol. 18, No. 5, Oct. 1990, pp. 176–181.

*Primary Examiner*—Scott A. Rogers
*Attorney, Agent, or Firm*—Baker, Maxham, Jester & Meador

[57] ABSTRACT

A method and system for gamut-mapping color images from device-independent form to device-dependent gamut in a Cartesian color space. Digital images are mapped to any device-dependent gamut in a manner that minimizes the human visual response both to the luminance and the chrominance changes necessary to force out-of-gamut pixels into the specified device-dependent gamut. A "neighborhood gamut mapping" technique considers the subjective visual effects of nearby pixels on the mapping of each pixel. Image luminance is biased toward the luminance in the device-dependent gamut at which the greatest chromamagnitude is available for a fixed hue angle. The chrominance of the mapped image is thereby imperceptibly adjusted to compensate for the human visual effects of luminance changes. Spatial filtering exploits the differing spatial frequency regions of insensitive human visual response to both luminance and chrominance changes.

22 Claims, 10 Drawing Sheets

COLOR IMAGE GAMUT-MAPPING SYSTEM WITH CHROMA ENHANCEMENT AT HUMAN-INSENSITIVE SPATIAL FREQUENCIES

BACKGROUND OF THE INVENTION

1. Field of the Invention

This invention relates generally to digital systems for transforming color images from one medium of expression to another and specifically to a digital system for transforming color images from an original form to a device-dependent form that appears to a human observer as a subjectively-accurate depiction of the original image.

2. Discussion of the Related Art

The actual or perceived quality of an imaging system depends primarily on the degree to which the output image appears to match the input image in the subjective opinion of the viewer. In a color image display or reproduction system, where an input color image is reproduced or copied as an output color image, the subjective fidelity between input and output images includes the color content of the image as well as the achromatic subject matter. That is, the various shades and intensities of the different colors in an image must appear to have the same relationship to one another as in the original image. Ideally, the colors of the output image are subjectively indistinguishable from the input image colors.

To ensure proper display of the output image, an imaging system must provide for "gamut mapping" of the original image to the limited range ("gamut") of colors available in the output display or reproduction device. For any particular image reproduction system, the input gamut and output gamut are not likely to be coextensive and generally exhibit substantial non-overlapping regions.

In certain color imaging systems, digital images are stored in "device-independent" form, which implies that the stored image was digitized with an image-sensing device possessed of a gamut that embraces a substantial portion of the entire human-sensitive visual color space. In such form, the image file includes image point ("pixel") data values representing image colors as perceived by a human observer. When the image is displayed or printed, the image pixel colors must be translated to the proper combination of output device parameters, such as beam currents (for CRT displays), ink quantities (for ink-jet printers), and the like. It is generally quite likely that some of the image colors found in the device-independent color space are not available in the output display. The range of colors available from an output display device is herein denominated the "device gamut". The process of translating device-independent image colors to device-dependent image colors is herein denominated "gamut mapping", which includes the process of substituting colors inside the device gamut ("in-gamut") for original colors falling outside of the device gamut ("out-gamut"). Much gamut mapping can be accomplished using "point processes," which are procedures that treat each pixel independently of all other image pixels. Such procedures are herein denominated "point gamut mapping" procedures. "Neighborhood gamut mapping" herein denominates similar procedures that consider nearby pixel colors when mapping a pixel to the device gamut.

Point gamut mapping procedures known in the art (see Gentile, R. S., et al., "A Comparison of Techniques for Color Gamut Mismatch Compensation", *Journal of Imaging Technology*, vol. 18, no. 5, Oct., 1990, pp. 176–181) include both clipping and compression techniques. Clipping techniques are those which map unrealizable input image colors to the border of the realizable output gamut. Compression techniques perform local color space scaling to map a local portion of the input image color space into the realizable output device gamut. With both techniques, each particular input color is always translated to a particular output color (one-to-one mapping) regardless of either the location of the pixel within the image or the pixel neighborhood color conditions.

Practitioners in the art have proposed many improvements to point gamut mapping procedures. Much of this art is directed to transferring video images to hard copy. For instance, in U.S. Pat. No. 4,670,780, McManus et al. disclose a method for matching hard copy colors to display colors for register-dot ink-jet copiers. McManus et al. teach a point-process mapping scheme that compresses the out-of-gamut colors to the gamut edges. Similarly, in U.S. Pat. No. 4,751,535, Myers discloses a technique for matching CRT display colors in a color print by transforming the CRT image coordinates through a linear mixing space such as a CIE Cartesian color space. Similar techniques are disclosed by Abdulwahab et al. in U.S. Pat. No. 4,839,721, by Walowit in U.S. Pat. No. 4,941,038, and by Chan in U.S. Pat. No. 5,107,332. Chan further teaches a method and system for continuously correcting for errors in color output of a color printer arising from changes in the system between input image and output print. Also, in U.S. Pat. No. 5,185,661, Ng discloses a system that corrects for color interpretation errors in the scanning color filter set before mapping the digital color image to a color printer gamut. Ng prefers a non-linear chroma compression scheme that retains some of the color distinctions among the out-gamut pixels.

In U.S. Pat. No. 4,812,902, Fuchsberger describes a system that compresses the image chrominance component on a pixel-by-pixel basis to reduce the image to an output gamut. In U.S. Pat. No. 4,812,903, Wagensonner et al. describe a system that selectively enhances contrast through the use of spatial-filtering and attempt to compensate for subjective changes in chroma magnitude by adjusting the chrominance signals according to the ratio of new to old luminance. Wagensonner et al. use a clipped chrominance compression scheme to reduce image gamut and employ spatial filtering only to permit selective enhancement of high spatial frequency luminance components. They neither consider nor suggest the use of spatial filtering to compensate for the subjective visual effects of chrominance compression. In U.S. Pat. No. 4,831,434, Fuchsberger also scales chrominance by the ratio of changes in image luminance employed for contrast enhancement in attempting to compensate for the subjective chrominance effects of the luminance changes.

Other practitioners have suggested improved methods for color-correction during color photograph negative processing and printing. For instance, in U.S. Pat. No. 4,825,297, Fuchsberger et al. propose a system for contrast-amplification that does not construct an explicit linear color-space image representation but instead processes the original image in some unspecified form. Fuchsberger et al. pass the image through both a low-pass filter and a high-pass filter, amplifying the high-pass filter output with a non-linear amplifier that compresses the dynamic range of the image signal and then passing the result through a non-linear point process before combining the result with the low-pass filter output. Their desired contrast-enhancement arises from the resulting low spatial bandwidth in dark image regions and high spatial bandwidth in bright image regions. Fuchsberger et al. neither consider nor suggest application of their method to the chrominance elements of an image. In U.S. Pat. No. 4,933,754, Reed et al. discloses a system for adjusting the contrast (luminance) of a photographic print by scanning the negative and digitizing the image for use in selectively controlling a matrix of liquid crystal elements interposed between a lamp and the developed film negative.

Other practitioners have suggested image gamut mapping improvements applicable to video-to-video display conversions. For instance, in U.S. Pat. No. 4,721,951, Holler discloses a fundamental interactive color selection system that permits an interactive user to make changes in gamut-mapping parameters and observe the results immediately on side-by-side image displays. Similarly, in U.S. Pat. No. 5,012,333, Lee et al. disclose an interactive method for dynamic range adjustment applicable to printing digital color images. Lee et al. teach limiting contrast (luminance) changes to the low-spatial frequency components of the image while preserving or enhancing the contrast (luminance) in high-spatial frequency image components. The user may interact with the system by adjusting gamut-mapping curves and comparing input and output images on side-by-side displays.

Also, in U.S. Pat. No. 5,138,303, Rupel discloses a dynamic-range compression system for mapping a higher number of intensity levels from a digital image to a lower number of intensity levels supported in an output image display by dithering the apparent intensity within a pixel neighborhood. Activating various numbers of neighborhood pixels gives the illusion of more display intensity levels for a given color than are supported by the pixel drivers.

All of the above point-process gamut-mapping techniques rely to some extent on either clipping or compression of chrominance intensity to force image pixels into the output device gamut. In the above-cited Lee et al. reference (U.S. Pat. No. 5,012,333, entirely incorporated herein by this reference), Lee et al. suggest limiting the gamut-mapping adjustment of luminance to the low spatial frequency components because human vision is less sensitive to luminance changes at the lower spatial frequencies (see, e.g., Davidson, M. "Perturbation Approach to Spatial Brightness Interaction in Human Vision," *Journal of the Optical Society of America*, vol. 58, No. 9, Sep. 1968, pp. 1300-1308; and van der Horst, G. J. C. et al., "Transfer of Spatial Chromaticity-Contrast at Threshold in the Human Eye," *Journal of the Optical Society of America*, Vol. 57, No. 10, Oct. 1967, pp. 1260-1266). However, Lee neither considers nor suggests optimizing his neighborhood gamut-mapping technique to minimize the subjective chrominance distortion resulting from the clipping or compression employed to fit the image to a gamut. Lee et al. adjust the contrast (luminance) of the low-frequency image components only, preserving or enhancing contrast of the high-frequency image components. By low-pass filtering, the luminance component of the image and subtracting a result from the luminance component to yield a high-pass filtered version of the luminance component of the image, Lee et al. essentially drive the luminance values of the final image toward middle gray while preserving in undiminished form the high-frequency changes in luminance (image features). Lee et al. neither consider nor suggest using the human insensitivity to low-frequency luminance changes to avoid visible chrominance distortion in the low-frequency region. Although the human spatial frequency response to chrominance was shown by van der Horst et al. to fall rapidly with increasing spatial frequency, until now, no practitioner has suggested gamut-mapping system improvements designed to exploit this human visual characteristic. There is still a clearly-felt need in the art for solutions to the unresolved problems and deficiencies in color image gamut-mapping technology. Some of these heretofore unresolved problems and deficiencies are solved by this invention in the manner described below.

SUMMARY OF THE INVENTION

This invention is a "neighborhood" gamut-mapping technique that for the first time exploits known spatial-frequency characteristics of human visual response to both luminance and chrominance. Spatial-frequency filtering is employed to minimize the visible effects of contrast enhancement (luminance adjustment). All gamut-mapping luminance changes are biased toward the highest chroma magnitude available at the original hue angle, thereby minimizing the visual effects known to result from contrast-enhancement in color images (chroma adjustment). Most pixels that fall outside of the output display gamut ("out-gamut") are mapped into the gamut using a combination of spatial filtering and non-linear compression embodied as weighted compensation of both luminance and chrominance image components. Finally, the most remote pixels can then be mapped using standard point processes.

It is an object of the system of this invention to minimize the subjective effects of the luminance and chrominance changes required to move out-gamut image points into the output display gamut. It is a feature of the method of this invention that pixel luminance is modified in a direction for which the maximum chroma is available at the pixel hue angle, thereby exploiting the spatial frequency features of human visual response to chrominance. It is an advantage of the system of this invention that the resulting output display image luminance differs from the original only at low spatial frequencies, where human visual response to luminance changes is minimal.

It is another feature of the system of this invention that changes made to pixel luminance are made responsive to the character of nearby pixels (neighborhood gamut-mapping). Moreover, it is yet another feature of the system of this invention that minor luminance changes are made to in-gamut pixels in the original image, thereby minimizing the number of changed pixels. Finally, it is a feature of the system of this invention that gamut-mapping luminance changes are scaled according to the out-gamut distance of the pixel and of neighboring pixels, thereby preserving distinction among out-gamut pixels.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
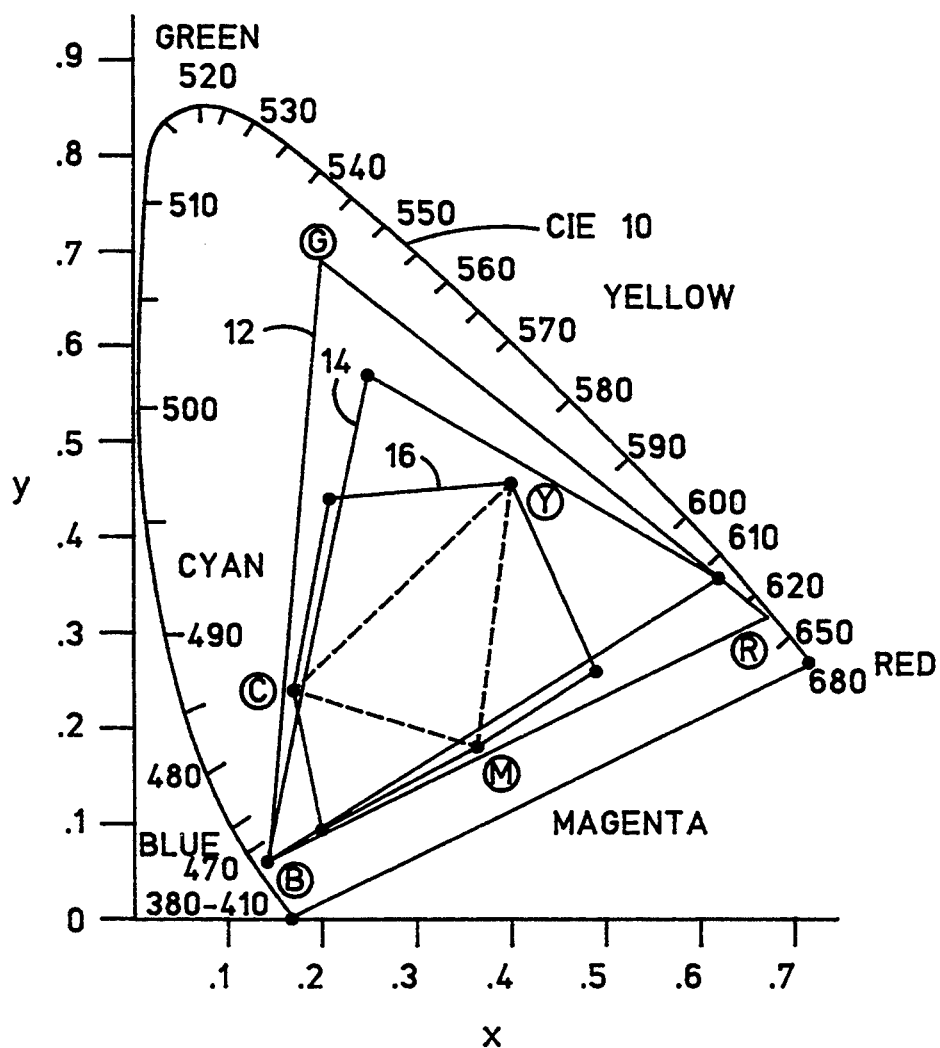
FIG. 1 is a color space chart from the prior art showing several illustrative display gamuts on a CIE xy chromaticity diagram.

Referring to FIG. 1, the general concept of a Cartesian color space is now described. The Commission International de L'Eclairage (CIE), or International Commission on Illumination, in 1931 defined a transformation to give all visible colors positive values in a (XYZ) color space. Derived from this XYZ color space by normalization, the C.I.E. xy chromaticity diagram is the generally horseshoe-shaped spectrum locus 10 in the xy plane on which points representing the chromaticities of the visible spectrum colors are plotted according to their wavelengths in nanometers (from 380 nm to 680 nm). Essentially, locus 10 represents the projection of the three-dimensional "gamut" of the human vision system in the CIE xy chromaticity space.

Three-dimensional color representations of images are much more tractable than spectral representations but even three-dimensional information is difficult to clearly represent on paper. One popular simplification is to remove the information pertaining to the luminosity of the color by normalizing each of the tristimulus value to their sum. This operation produces a measure of the color of a stimulus without regard to its intensity or its chromaticity. When the XYZ color space is normalized by this operation, three values, represented by lower case characters, are formed according to the relationships: $x=X/(X+Y+Z)$, $y=Y/(X+Y+Z)$, and $z=Z/(X+Y+Z)$. Because $x+y+z=1$, only two of the three are required to define the visible characteristics of an image point. The tradition in the art is to discard z, leaving x and y, which together define the xy chromaticity space shown in FIG. 1.

The triangular locus 12 represents a video display gamut, which bounds the colors that can be displayed by a particular three primary color system, such as the NTSC phosphor-set commonly used for color video display devices. The corners of gamut 12 are labeled with the RBG (red-blue-green) primary phosphor colors well-known in the art. Similarly, a second triangle 14 represents an alternative video display gamut, embracing colors available from an alternate phosphor-set known in the art that is somewhat more limited than video display gamut 12.

The irregular polygon 16 represents the hard-copy colors that can be produced by a color printer such as an ink-jet printer with cyan-magenta-yellow (CMY) and black ink colors for a particular paper. Because the CIE XYZ color space is a "linear mixing" space, the mixing of colors at the vertices of a display gamut can generate only the colors within that gamut. Thus, gamuts 12 and 14, relying only on three additive RGB phosphors, are triangular in shape. Because gamut 16 is based not only on the three subtractive CMY primary colors but also on three additional subtractive RGB primary colors obtained by superimposed CMY primaries, gamut 16 has six vertices instead of the three CMY vertices. As is well-known in the art, many different display devices and printing devices can be devised for color imaging, each represented by a different display gamut boundary.

For many purposes, it is desirable to have a three-dimensional color space in which one of the axes is associated with luminance and the other two axes contain only information relation to chromaticity. In 1976, the CIE standardized a color space denominated CIE 1976 (L*u*v), less formally known as CIELUV, which accounts for the psychophysics of human vision by constructing a three-dimensional color space that is substantially uniform perceptually. The coordinates of an image point in CIELUV requires a point in XYZ to be normalized with respect to the XYZ coordinates of a "white point", as defined in the art. One axis of CIELUV is denominated the CIE 1976 Lightness, or L*, and is defined using a cube-root function in XYZ with a straight-line segment at the origin. The position of a color along the L* axis contains only information derived from its luminance as related to the reference white point. The other two axes of CIELUV are derived from the chromaticity of the image point related to the chromaticity of the reference white point. Multiplying the difference between the chromaticities of the image point and the reference white point by a value proportional to L* mimics the psycho-physical effect that causes darker colors to appear less chromatic, thus leading to perceptual uniformity in the CIELUV space.

Figure 2:
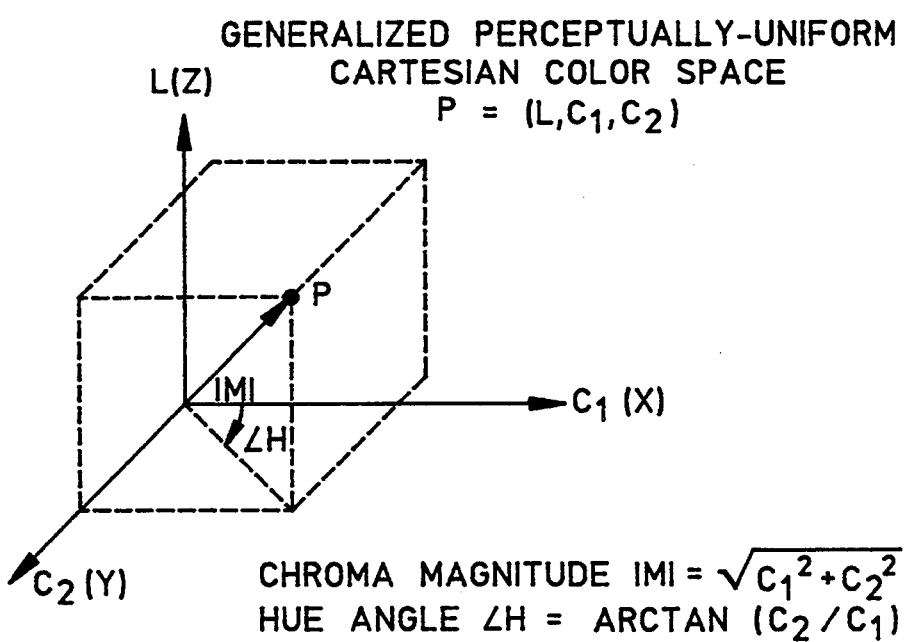
FIG. 2 is a chart from the prior art showing the relationship between Cartesian (L,$C_1$,$C_2$) color space coordinates and cylindrical (L, H, M) color space coordinates.

The cylindrical representation of CIELUV is also useful. The L* axis remains unchanged while the plane defined by the two Cartesian chrominance axes is expressed in terms of a phase angle corresponding to hue and a radius associated with chroma magnitude. In 1976, the CIE also standardized another perceptually-uniform color space with characteristics similar to CIELUV, denominated the CIE 1976 (L*a*b), or CIELAB, which also can be expressed in terms of a Cartesian coordinate system (L by a by b) or a cylindrical coordinate system (L by hue by chroma). FIG. 2 illustrates the relationships between the three Cartesian coordinates and the two cylindrical coordinates in a perceptually-uniform color space. The three Cartesian bases are herein denominated luminance (L) and chrominance ($C_1, C_2$) as shown. The Cartesian chrominance plane is also herein described in terms of two polar chrominance bases denominated chroma magnitude (M) and hue angle (H). Thus, for the purposes of this disclosure, chroma magnitude (M) is defined as the square root of the sum of the squares of the two chrominance values ($C_1$ and $C_2$) and hue angle (H) is defined as the arctangent of the ratio of the two chrominance dimensions ($C_2/C_1$), substantially as shown in FIG. 2 and as known in the art for perceptually-uniform color spaces.

Figure 3:
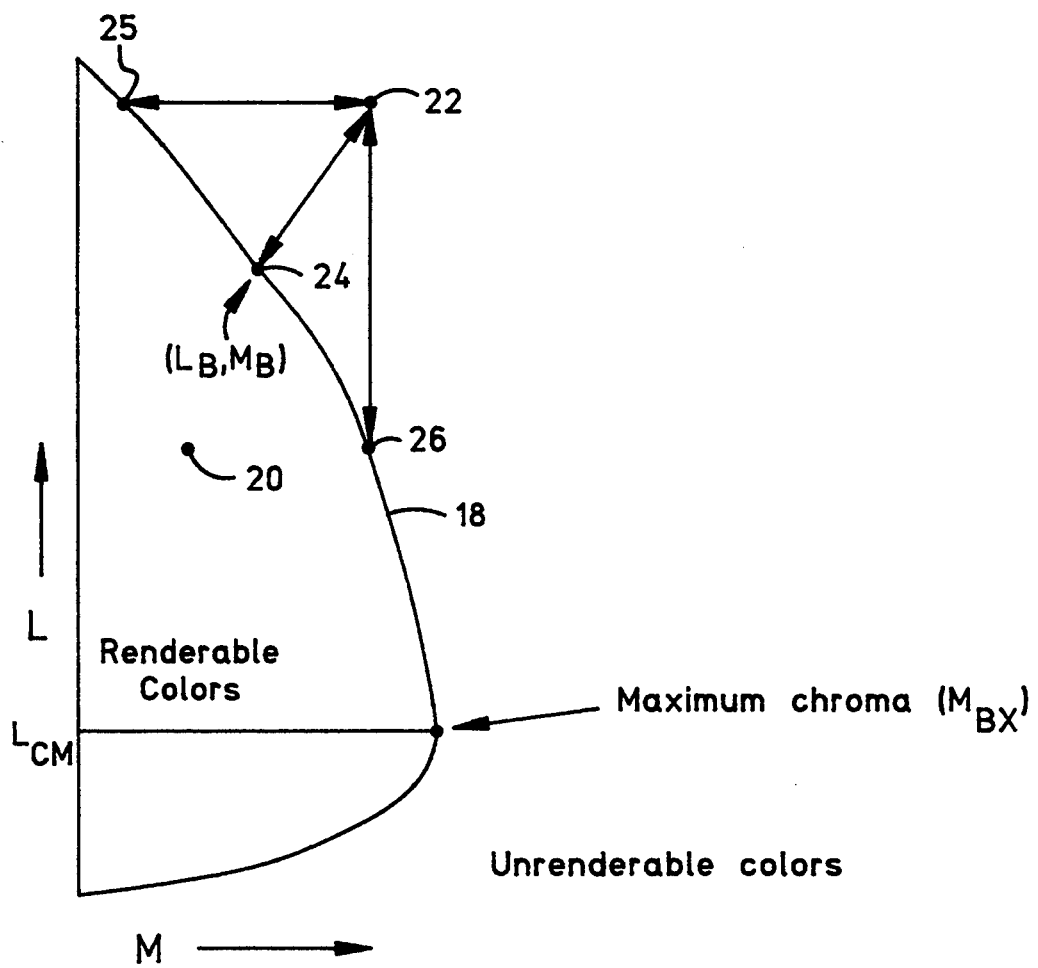
FIG. 3 is a chart from the prior art illustrating a device-dependent gamut boundary expressed as a function of luminance and chroma magnitude for a constant hue angle.

It can be appreciated that the gamuts shown in FIG. 1 represent only the display restrictions independent of luminance. FIG. 3 shows a representative gamut boundary 18 for a plane of constant hue angle (H) from the space shown in FIG. 2. That is, the plane of FIG. 3 represents a vertical slice through the origin of the three-dimensional coordinate system shown in FIG. 2. Gamut 18 is seen to vary from zero chroma magnitude (M) at zero luminance (L) through a maximum chroma ($M_{BX}$) at luminance $L_{CM}$ and therefrom back down to zero at some high value of luminance. That is, the display represented by gamut 18, for a fixed hue angle (H), is capable of generating a particular range of chroma magnitude (M) at each luminance within some range of luminance and none beyond that range. Thus, within gamut 18, there is at lease one maximum chroma value ($M_{BX}$) for each hue angle (H) and this $M_{BX}$ value occurs at a single luminance value, herein denominated $L_{CM}$. It can be appreciated that luminance $L_{CM}$ varies with hue angle over the entire range of hue angles, for any particular display gamut such as gamut 18.

FIG. 3 also shows two input image pixels. Pixel 20 is shown falling within gamut 18 and is herein denominated an in-gamut pixel 20. Pixel 22 falls outside of gamut 18 and herein denominated an out-gamut pixel 22. The fundamental gamut-mapping problem is to represent out-gamut pixel 22 in terms of in-gamut pixels such as pixel 20. It can be appreciated that an out-gamut pixel can be replaced with any in-gamut pixel shown in FIG. 3 without changing the hue, since FIG. 3 represents a constant hue angle. For instance, the pixel 24 on the boundary of gamut 18 can be chosen to represent input pixel 22 by reducing both luminance and chroma values to those values at the nearest gamut boundary point ($L_B$ and $M_B$). Similarly, both hue angle and luminance can be held invariant and chroma reduced to $M_B$ on the gamut boundary at the point 25. Alternatively, both hue angle and chroma magnitude can be held fixed and the luminance value reduced to $L_B$ on the boundary of gamut 18 at pixel 26. Disadvantageously, some out-gamut points may have image chroma magnitude ($M_I$) that exceeds the maximum chroma ($M_{BX}$) available for the particular image hue angle ($H_I$). If $M_I > M_{BX}$, then changes in luminance alone are insufficient to bring the image pixel inside gamut boundary 18. The shortest distance between pixel 22 and gamut boundary 18 (at point 24) requires changes in both luminance and chroma magnitude, thereby degrading the quality of the image reproduction to the human observer. It is an important feature of this invention that compensation is provided for these changes to overcome much of this visible degradation in the reproduced image.

Figure 4:
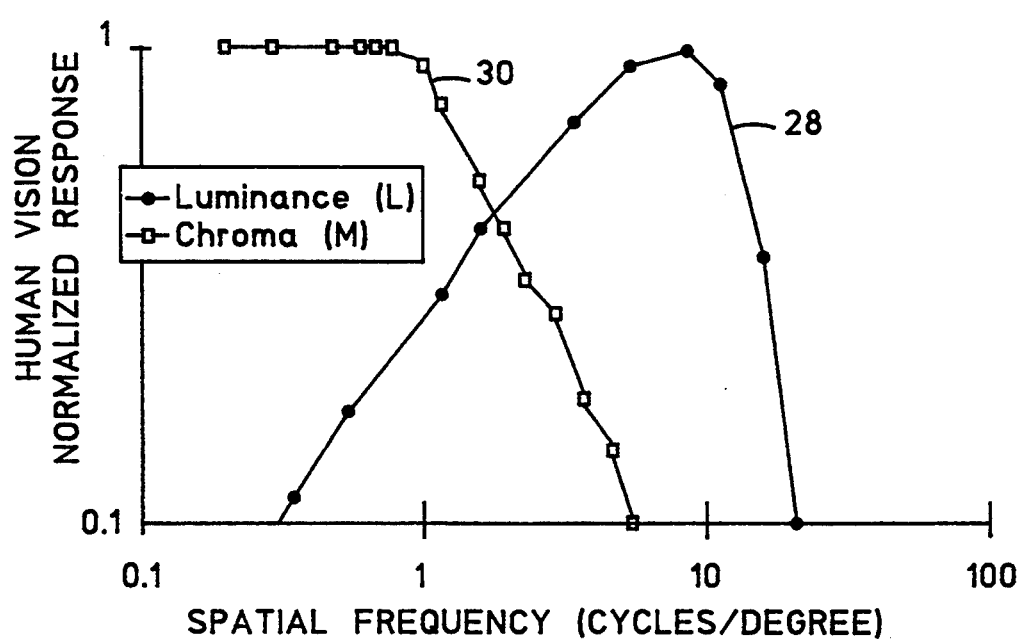
FIG. 4 is a chart from the prior art illustrating the human spatial frequency visual response to luminance and chroma magnitude.

FIG. 4 shows two human vision normalized response curves reported in the above-cited Davidson and van der Horst et al. references, which are entirely incorporated herein by this reference. In 1968, Davidson measured the human spatial frequency response to luminance and determined that a broad peak existed at around eight cycles/degree, shown in FIG. 4 as curve 28. In 1967, van der Horst et al. measured the human spatial frequency response to chrominance and found an attenuation of sensitivity at high spatial frequency, with the knee of the response occurring at about one cycle/degree, shown for blue-chromaticity (contrast=900td) as curve 30.

The method and system of this invention arise in part from the unexpectedly advantageous observation that the human visual response to luminance is substantially impaired in a spatial frequency region where the human visual response to chrominance remains strong (below one cycle/degree in FIG. 4). In particular, this observation led directly to the unexpectedly advantageous discovery that chroma magnitude (color saturation) can be improved at low spatial frequencies by varying the value of luminance according to particular display features. The method and system of this invention accomplish this by biasing luminance changes in a direction that allows greater chroma magnitude at low spatial frequencies.

Output devices in general and printers in particular have gamuts that are highly irregular when expressed in any of the usual standard color spaces such as CCIR 601 YCbCr, CIE $L^*a^*b$, CIE $L^*u^*v$, NTSC YIQ, and Munsell. For example, in CIE $L^*a^*b$ or $L^*u^*v$, the maximum chroma magnitude available for yellows occurs at high luminance values while the maximum chroma magnitude available for blues occurs at low luminance values. Thus, mapping out-gamut points into the device-dependent gamut by changing luminance alone is, according to the method of this invention, made more effective by moving the luminance in the direction of that value for which maximum chroma magnitude is available (without changing the hue angle). This strategy compares with the practice disclosed in the above-cited Lee et al. reference of moving the luminance value toward the same point without considering the out-gamut pixel chrominance values and exploits the expectedly advantageous observation that maximum chroma magnitude occurs at various luminance values depending on the pixel hue angle (in device-dependent gamuts). Thus, the "neighborhood" gamut-mapping method of this invention improves subjective display image rendering by moving the luminance in the direction of maximum available chroma at the image pixel hue angle rather than always moving the luminance toward the same (closest boundary pixel) value regardless of the pixel chrominance values. This modifies the luminance plane of the input image so that the luminance of each out-gamut pixel is moved in the direction of the luminance $L_{CM}$ (FIG. 3) and does so only at low spatial frequencies to which humans are relatively insensitive to luminance variations. This method is now described in more detail.

Figure 5:
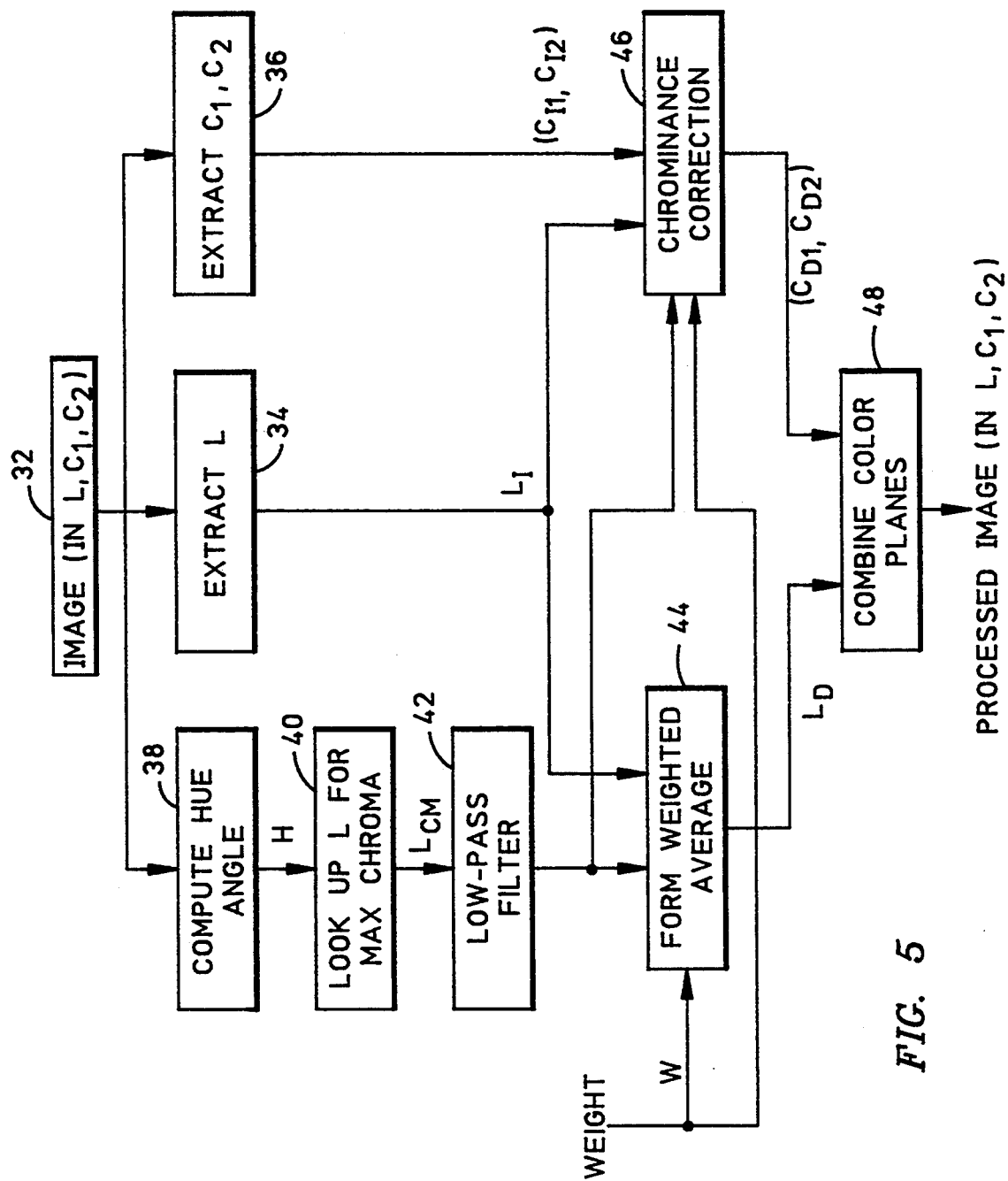
FIG. 5 is a functional block diagram showing a first exemplary embodiment of the gamut-mapping method of this invention.

FIG. 5 provides a simple illustrative embodiment of the method of this invention. The functional procedure shown in FIG. 5 begins with the source image in ($L, C_1, C_2$) color space at 32. The luminance ($L_I$ component is extracted at step 34 and the two chrominance components ($C_{I1}, C_{I2}$) are extracted at step 36. In step 38, the hue angle (H) is computed as the arctangent of the ratio of the two chrominance components. Step 40 provides the value of luminance (L) for which chroma magnitude (M) is maximized at the computed hue angle (H). Referring to FIG. 3, the output of step 40 represents the luminance value ($L_{CM}$). The implementation of step 40 is preferably accomplished by creating a simple one-dimensional lookup table that has an entry for every hue angle to which the hue angle image may be quantized. If such quantization is too refined to make this practical, a more sparsely-populated lookup table may be employed with interpolation.

Step 42 is a low-pass spatial filter operation performed on the chroma-maximized luminance signal ($L_{CM}$). The method of this invention modifies the luminance of the input image in such a way that moves the luminance of each pixel in a direction of that luminance for which maximum chroma is available (without changing hue angle) and does so in such a way that only those luminance changes in the human-insensitive spatial frequency region remain in the output signal. The purpose of the low-pass filtering step 42 is to eliminate the high spatial-frequency component of the chroma-maximized luminance signal ($L_{CM}$) before recombining it with the image luminance signal ($L_I$) at step 44 to create the display image luminance signal ($L_D$).

The operation used to form the weighted average at step 44 is preferably a simple weighting formula such as $L_D = WL_{CM} + (1-W) L_I$, where W equals a weighting factor in the interval [0,1]. When $W=1$, $L_D$ then merely equals the original image luminance $L_I$, and when $W=0$, the result $L_D$ is a blurred version of the luminance for maximum chroma ($L_{CM}$) of each pixel in the original image (useless for realistic image processing). According to the method of this invention, intermediate values of W are likely to produce effective results by modifying the mapped luminance to improve chroma magnitude in a fashion that is not readily visible to a human observer.

It is possible that the device-dependent gamut represented in the selected color space exhibits a concave characteristic instead of the convex characteristic exemplified by FIG. 3. With a concave constant-hue gamut boundary, moving a pixel along the luminance (L) axis toward maximum chroma ($M_{BX}$) may actually reduce chroma magnitude at intermediate points. Because most devices exhibit convex fixed-hue gamut boundaries, this occasional possibility is best accommodated in selecting the weight (W) and threshold (T) parameters discussed below.

In FIG. 5, the two image chrominance values are corrected at step 46 before recombining at step 48 to form the processed output image. The purpose of step 46 is to correct the chrominance planes for the changes in luminance introduced by the gamut-mapping steps 38–44. Chrominance correction is necessary to accommodate the observed psychological effect that increases apparent chroma with increases in luminance. Because the luminance corrections performed at step 44 operate to increase the actual chroma magnitude in the output color space, they may be considered as equivalent to changing the amount of light shining on objects in the image. Without the chrominance correction step 46, darkened colors would appear to be too chromatic and lightened colors would appear to be unsaturated. According to the method of this invention, chrominance correction step 46 is optional and, when used, is preferred as a simple ratio adjustment, such that the two chroma components are adjusted proportionately to the resulting ratio of $L_D/L_I$, which is the technique described by Wagensonner et al. in the above-cited reference (U.S. Pat. No. 4,812,903, which is entirely incorporated herein by this reference).

Figure 6:
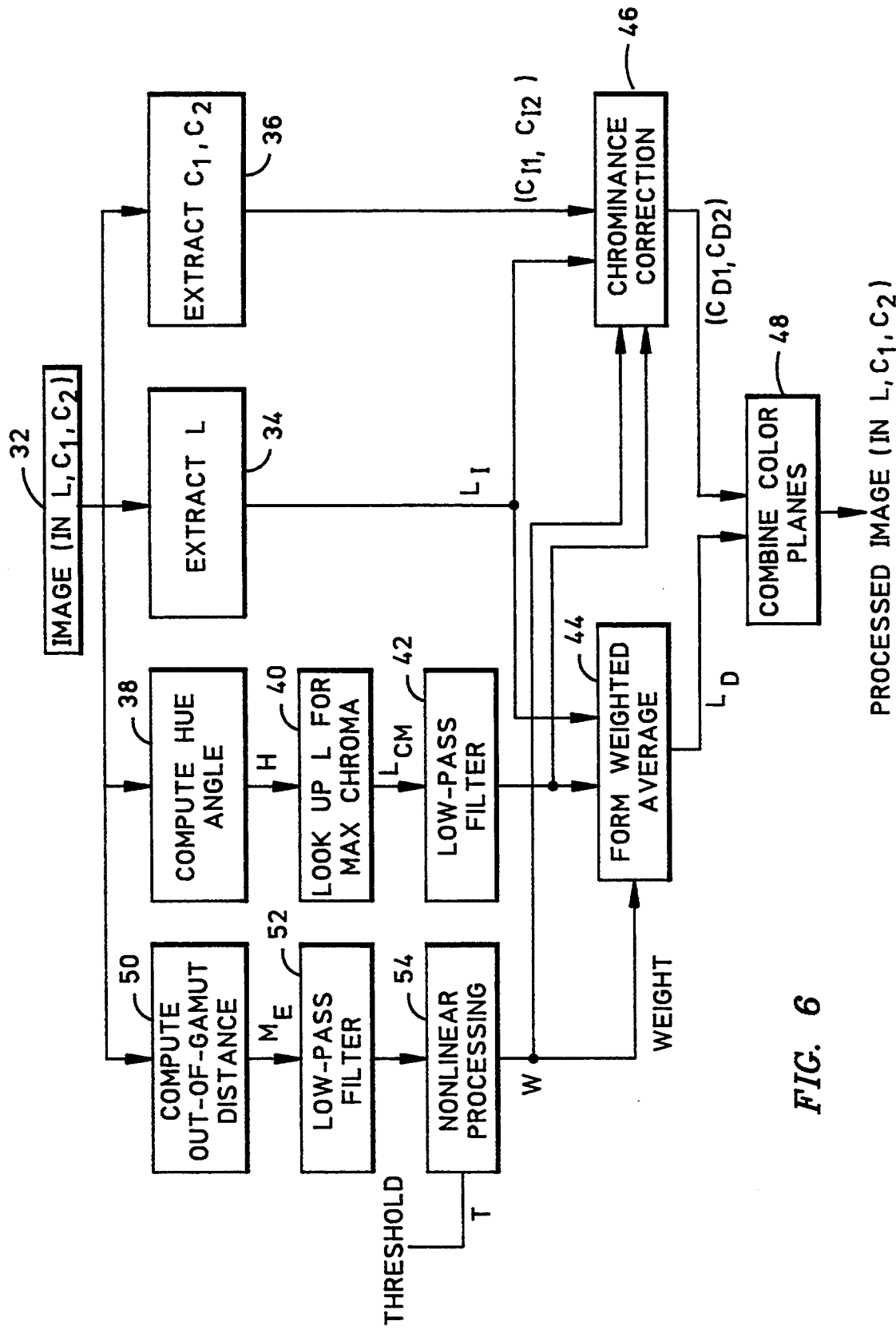
FIG. 6 is a functional block diagram showing a second exemplary embodiment of the gamut-mapping method of this invention.

The simple procedure discussed above in connection with FIG. 5 can be improved to eliminate unnecessary luminance changes to in-gamut pixels. One such improvement is shown in FIG. 6. In FIG. 6, steps 50–54 are added to extract the weight (W) discussed above in connection with step 44. The out-gamut distance computation step 50 preferably employs a three-dimensional lookup table using interpolation to produce a gamut error signal ($M_E$) representing the distance between the out-gamut pixel and a point on the gamut boundary having chroma magnitude ($M_B$), which can be understood with reference to FIG. 3. In FIG. 3, three such boundary points 24, 25 and 26, each having a different $M_B$ value, serve to exemplify the distance relationships involved in a lookup table implementing step 50.

Many color spaces are suitable for use in measuring out-gamut distances, including color spaces with pretensions to visual-uniformity, such as CIE $L^*a^*b$ or $L^*u^*v$. In both of these CIE color spaces, the Euclidean distance between colors is roughly proportional to the apparent visual difference between them, at least for small distances. After choosing a suitable color space, the method for computing out-gamut distance is then established.

Referring to FIG. 3, a reasonable method is to select the shortest distance between the input pixel 22 and gamut boundary 18 (shown as point 24). If desired, a constant chroma distance (requiring only changes in luminance) such as the distance between input pixel 22 and boundary point 26 may be used. However, if the chroma magnitude of the input pixel exceeds $M_{BX}$, no such distance exists, as mentioned above. This problem can be corrected by establishing an upper limit on the out-gamut distance parameter to be used whenever pixel 22 exceeds $M_{BX}$. With such an arrangement, all gamut error distances can be expressed in terms of luminance changes alone.

Alternatively, and preferably, the gamut error signal $M_E$ is derived by selecting the distance between the chroma magnitude $M_I$ of the original pixel 22 and the gamut boundary chroma magnitude $M_B$ (point 25) without changes to either hue angle or luminance. Using this preferred technique, the gamut error signal $M_E$ represents a chroma image that is positive whenever the image pixel is out-gamut and which varies as a linear measure of the out-gamut distance of the image pixels.

This gamut error signal $M_E$ is then low-pass filtered at step 52 to remove high spatial-frequency components and then processed in step 54 to clip and scale as necessary to create the weight (W) used by the averaging step 44. The low-pass filtering step 52 is calibrated to take advantage of the human vision luminance response shown in FIG. 4 as curve 28. That is, luminance changes are made in the human-insensitive portion of the spatial frequency region to correct for human-perceived chrominance distortion arising from the effects of luminance changes required to squeeze out-gamut image points into a device-dependent gamut. This is accomplished in steps 42 and 44 because these steps effectively eliminate human-visible luminance changes while allowing low-frequency (human-invisible) luminance adjustments in a direction that increases the chroma available from the particular device. This filter may also be modified to compensate for changes in subtended visual angle arising from the pixel position in the image: that is, the spatial frequency parameter can be adjusted according to apparent visual angle subtended by a fixed pixel at the edges of an image to compensate for spatial-frequency increases arising from the trigometric relationship between the two distances from the pixel to the image center and to the viewer's eye.

Figures 7, 7A:
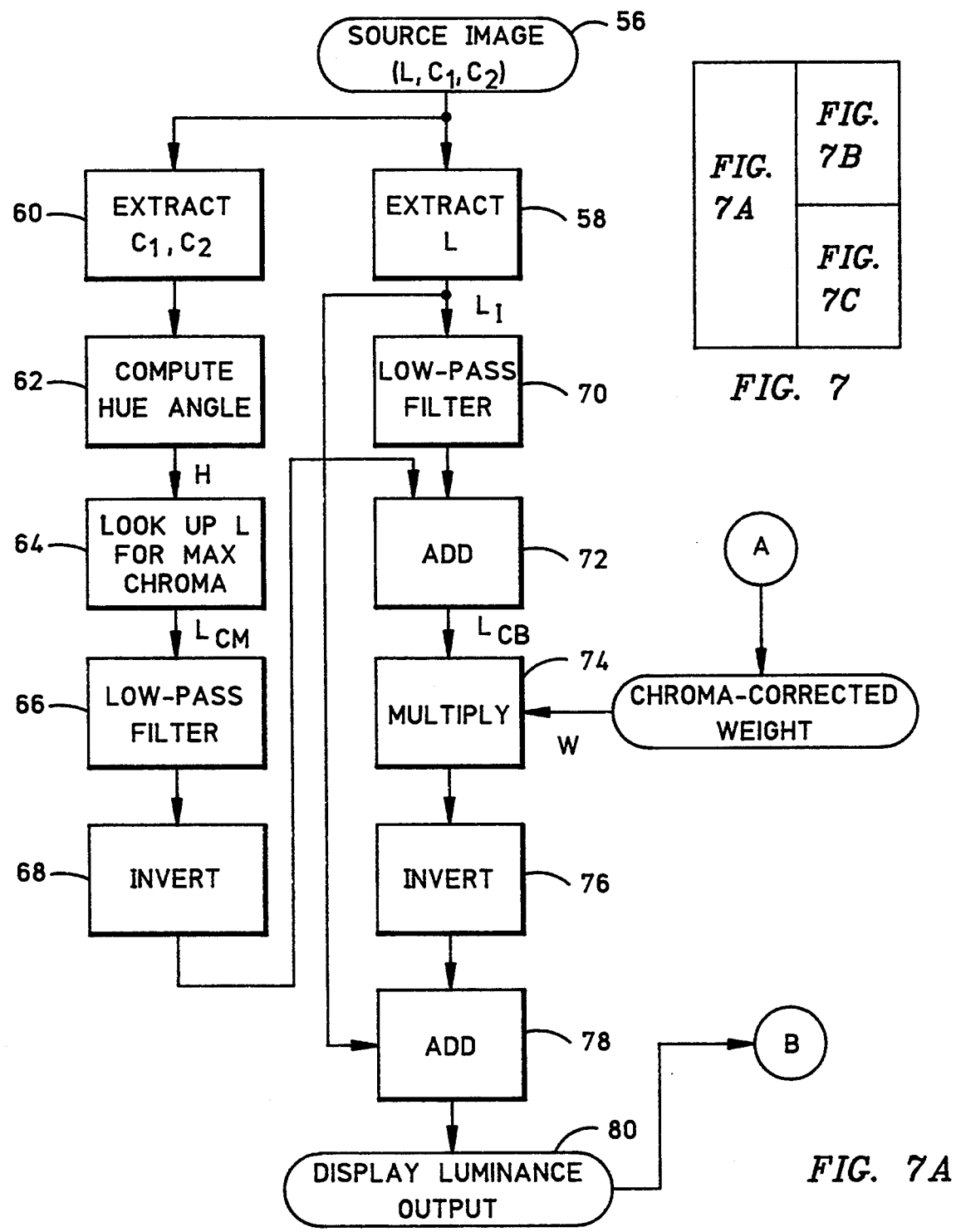
FIG. 7, comprising
FIGS. 7A–7C, is a functional block diagram showing the preferred embodiment of the gamut-mapping method of this invention.
Figure 7B:
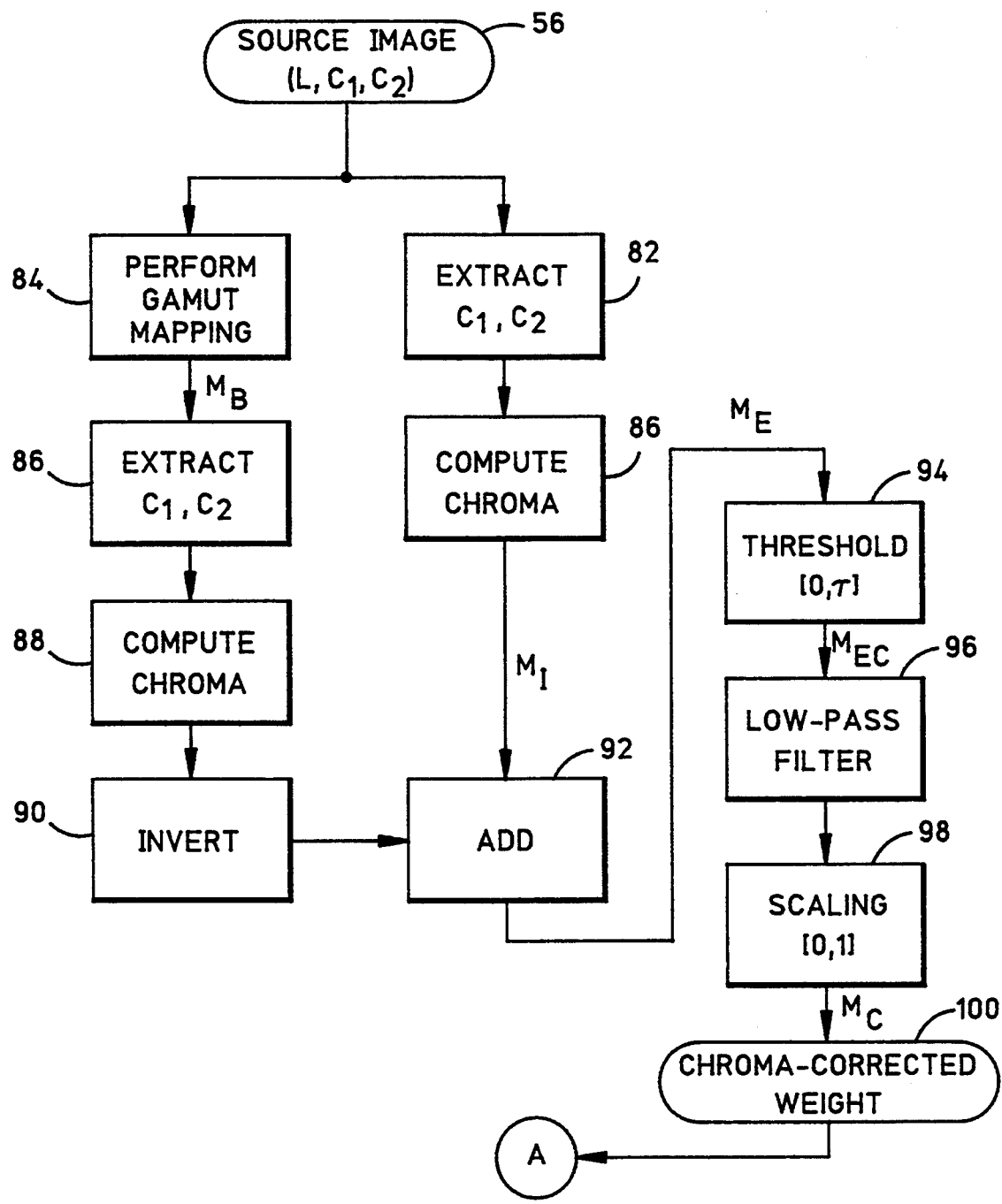
Figure 7C:
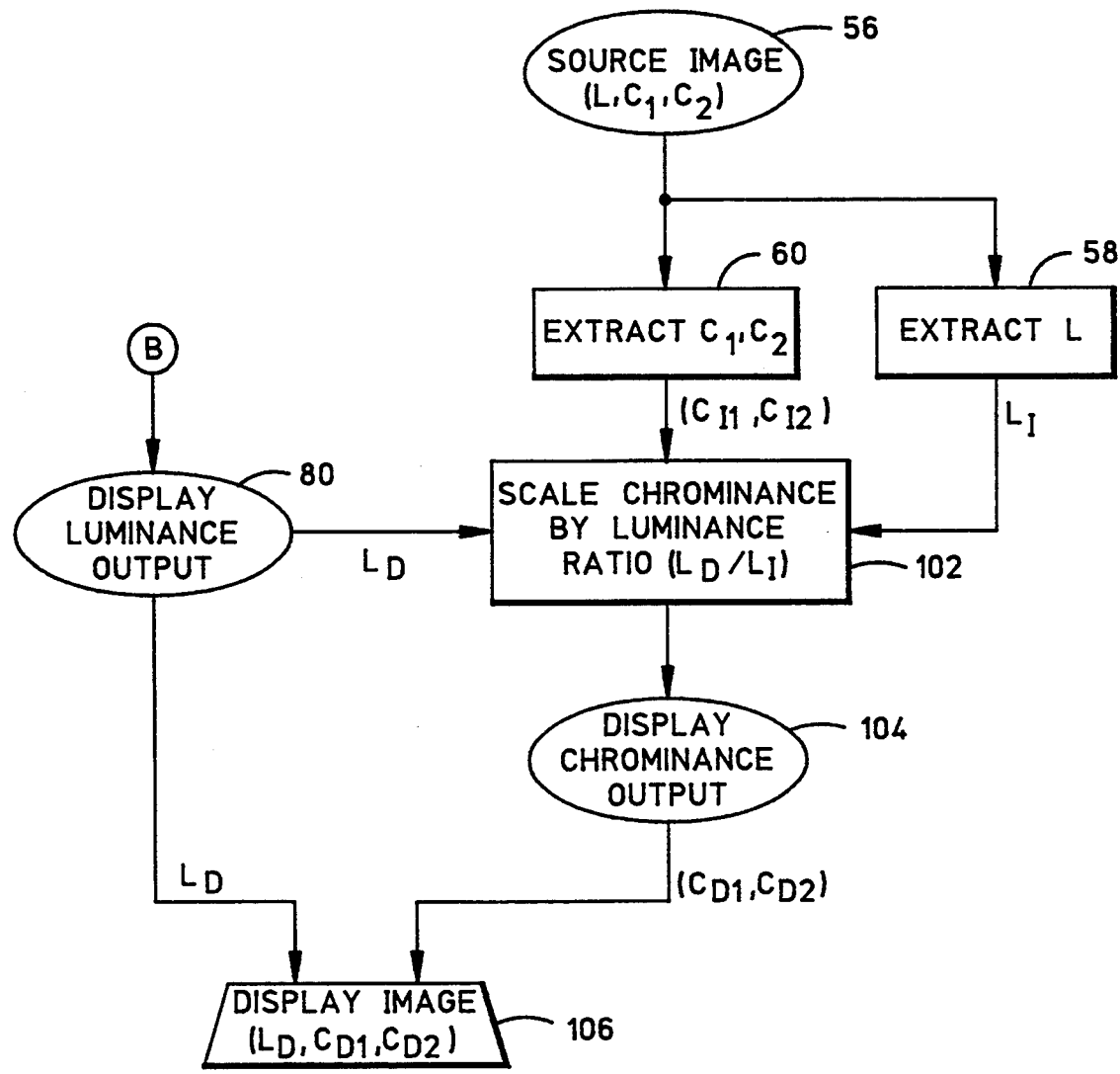

FIG. 7, including FIGS. 7A–7C, provides a functional block diagram of the preferred embodiment of the gamut-mapping method of this invention and includes steps preferred for high-speed electronic implementation. In FIG. 7A, the source image is produced at step 56 in the (L,$C_1$,$C_2$) color space and the luminance and chrominance components extracted at steps 58 and 60, respectively. The CIE L*a*b color space is suitable for use with the method of this invention. In step 62, hue angle is computed according to the formula H=arctan ($C_2/C_1$). In step 64, the hue angle (H) is used to address a lookup table containing the luminance for which the maximum chroma $M_{BX}$ is available from the output device gamut. For most chrominance spaces, the maximum chroma magnitude is equal to the square root of the sum of the squares of the maximum available values for $C_1$ and $C_2$.

In step 66, the chroma-maximized luminance signal $L_{CM}$ is filtered to remove high spatial-frequency components. The filtered luminance signal is then inverted at step 68 by reversing sign and then added to the original image luminance signal $L_I$ (after filtering in step 70) at step 72 to create a spatially-filtered color-biased luminance signal $L_{CB}=L_I-L_{CM}$.

The color-biased luminance signal $L_{CB}$ is then multiplied by a weight (W) at step 74. The weighted signal is then inverted at step 76 and added to the original image luminance signal $L_I$ at step 78 to create the display luminance signal $L_D$ at step 80.

The display luminance signal $L_D$ can be written as follows:

$$L_D=L_I-(L'_I-L'_{MC})\,W \quad [\text{Eqn. 1}]$$

In Eqn. 1, (L') denominates low-pass filtered luminance (L). If W=1, then display luminance $L_D$ is mapped, on average (which means that $L_I=L'_I$) to the luminance for maximum chroma ($L'_{CM}$). If an out-gamut pixel luminance is 50 and the luminance for maximum chroma at the hue angle of that pixel is 20, then the display luminance will be $L_D=50-(50-20)*1=20$. If W<1, the display luminance $L_D$ is moved in the direction of the luminance for maximum chroma ($L_{CM}$) but is not moved entirely to that value.

The procedures shown in FIG. 7A operate alone to move the luminance of all pixels, whether out-gamut or not, and moreover operate to move out-gamut colors independent of the amount of distance from the gamut boundary. The additional procedures in FIGS. 7B–7C required to improve these undesirable characteristics are now described.

In FIG. 7B, the source image at 56 is presented for extraction of the chrominance values at step 82 and for gamut mapping at step 84. The image chroma magnitude $M_I$ is computed at step 86 as substantially the square root of the sum of the squares of the two chrominance values ($C_1,C_2$). Step 84 uses a lookup table created with the knowledge of the device-dependent gamut in the selected color space. The mapping operation of step 84 preferably, but not necessarily, computes the gamut boundary point in the chroma magnitude dimension corresponding to image hue and luminance (e.g., point 25 is produced for image point 22 in FIG. 3). This represents the closest gamut boundary point along the chroma magnitude (M) axis and generates a signal herein denominated the gamut boundary chroma magnitude ($M_B$). Other mapping schemes may also be used at step 84 to create a gamut boundary chroma magnitude ($M_B$) with different hue and luminance values. In this preferred embodiment, $M_B$ represents the chroma magnitude value of a point on the gamut boundary 18 having the hue angle ($H_I$) and luminance ($L_I$) values of the image pixel being mapped. For in-gamut pixels (e.g., pixel 20), the value of $M_B$ is set to $M_I$. At step 86, this chroma signal is used to extract the two equivalent Cartesian chrominance signals ($C_1,C_2$) in the selected color space. Chroma magnitude $M_B$ is recomputed at step 88 and inverted at step 90 preparatory to combination with the original image chroma magnitude $M_I$ at step 92 to produce the gamut error signal $M_E=-M_I-M_B$. Thus, the output of step 92 is a chroma image $M_E$ that is zero for in-gamut pixels ($M_E=M_I-M_I$) and positive whenever the pixel is out of gamut, where such positive value directly indicates the out-gamut distance.

In step 94, the chroma error signal ($M_E$) is clipped to force all chroma values above a threshold (T) to the threshold value. The clipped result ($M_{EC}$) is then low-pass filtered at step 96 and scaled at step 98 to produce a chroma correction signal representing a normalized chroma-corrected weight (W) valued in the interval [0,1], which is then passed to the remainder of the process described above in connection with FIG. 7A. Thus, out-gamut pixels are weighted according to their distance out-gamut except, for remote out-gamut pixels, a fixed threshold weight (T) is used instead to limit the luminance changes made to said remote out-gamut pixels, which are more properly clipped by a point-process gamut-mapping procedure applied subsequently.

FIG. 7C provides a simple illustration of a preferred embodiment of the chrominance correction step 46 from FIG. 6. The extracted luminance and chrominance information together with the display luminance signal $L_D$ are combined in step 102 to permit simple scaling of the chrominance components according to the changes made to the luminance component. The results are recombined at step 104 to provide the two display chrominance components ($C_{D1},C_{D2}$), which represents the remaining information necessary to construct the final gamut-mapped display image at 106.

Figure 8:
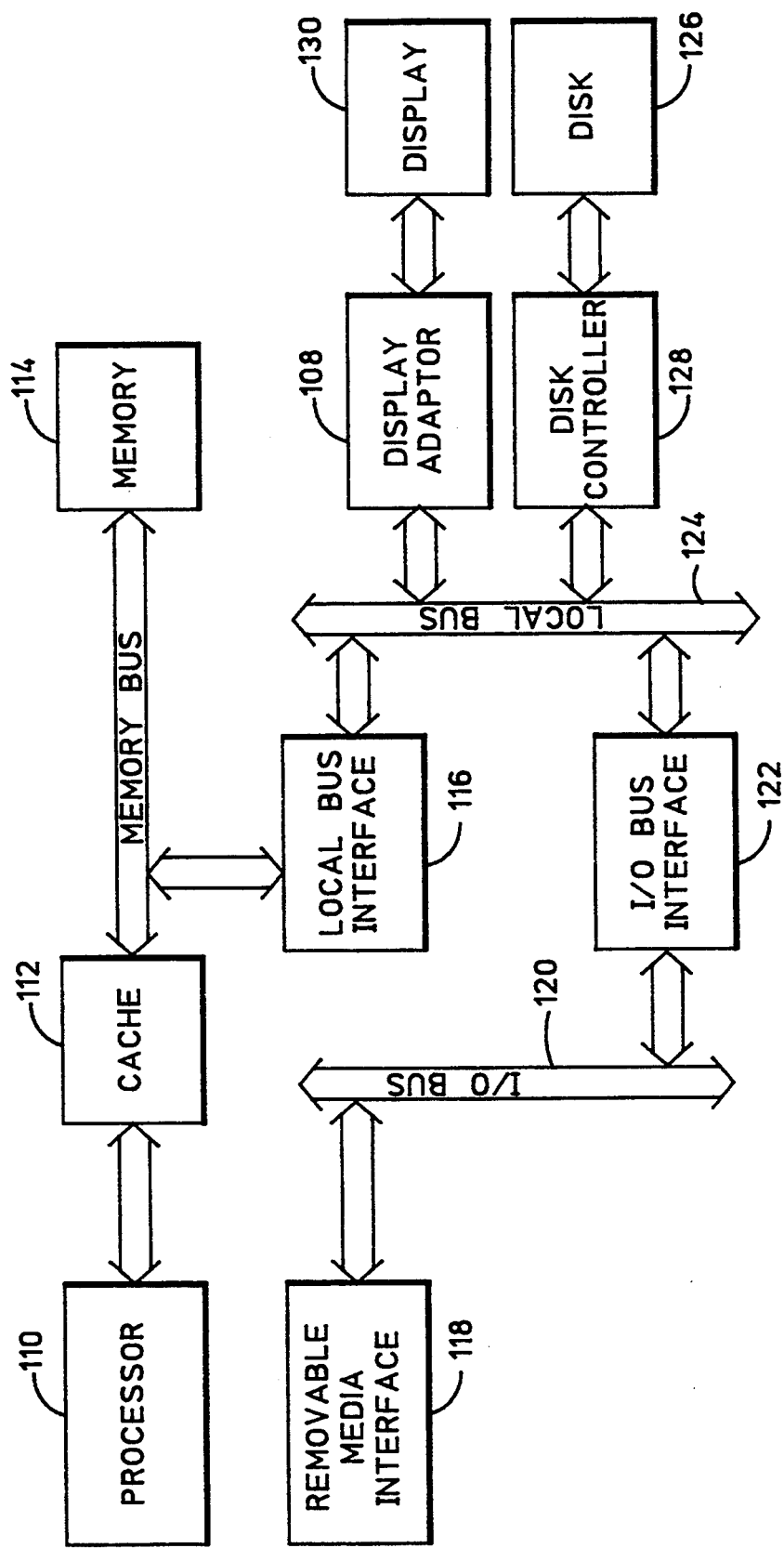
FIG. 8 is a functional block diagram showing an exemplary embodiment of a digital color image storage and display system suitable for implementing the gamut-mapping method of this invention.

FIG. 8 provides a typical digital data system suitable for implementing the method of this invention as a display adaptor 108. A processor 110 is coupled to a cache memory 112 and therefrom to a main memory 114 and a local bus interface 116 in the usual manner known in the art. A removable media interface 118 is coupled through an input/output bus 120 and therefrom by way of a I/O bus interface 122 to a local bus 124, which is coupled to local bus interface 116. A data storage disk 126 is coupled to local bus 124 by way of a disk controller 128. Display adapter 108, embodying the system of this invention, is coupled to display 130 for displaying gamut-mapped images and also to local bus 124 for receiving device-independent images from storage.

Figure 9:
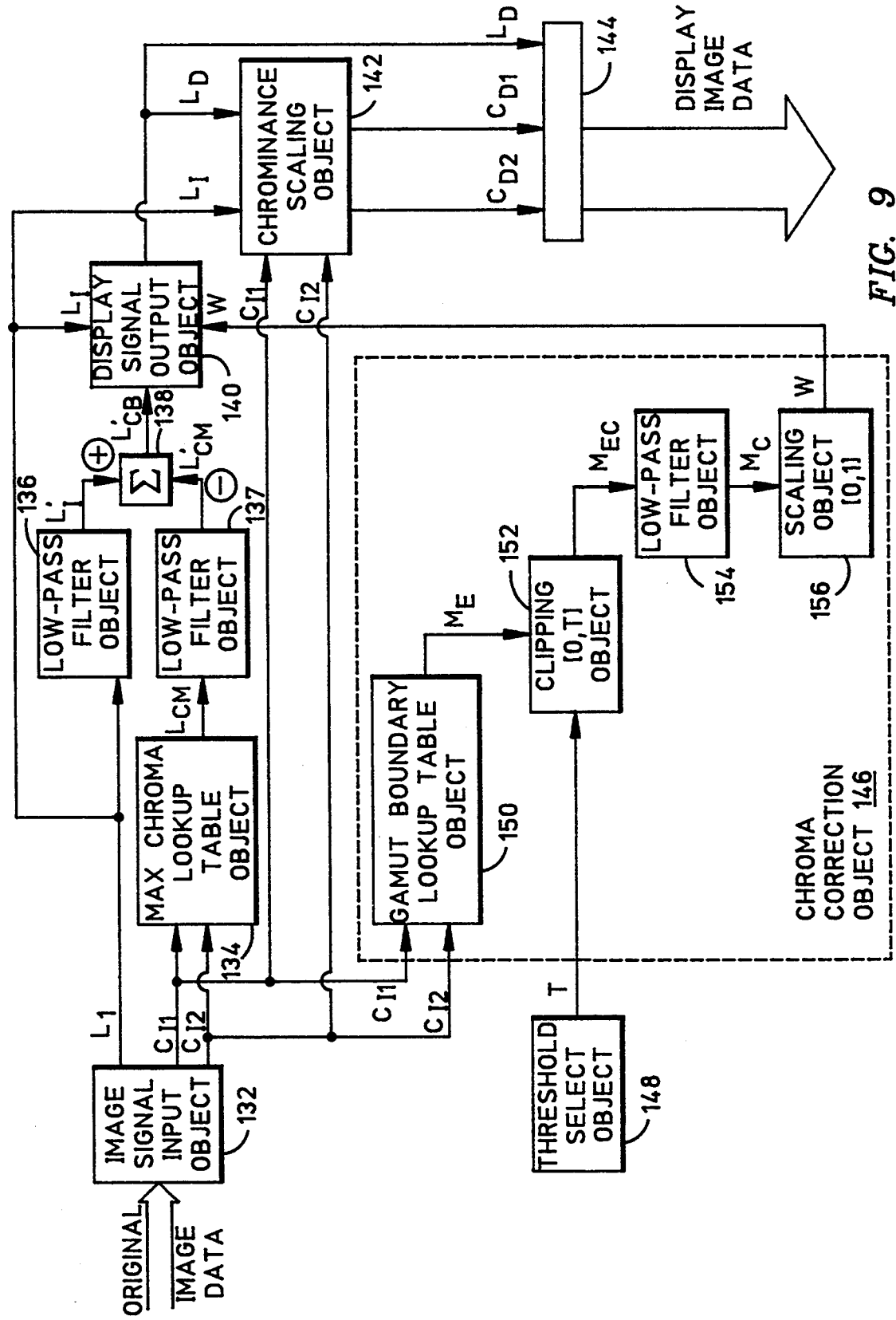
FIG. 9 is a functional block diagram showing an illustrative embodiment of the gamut-mapping system of this invention.

FIG. 9 provides an exemplary embodiment of the system of this invention as it might appear in display adapter 108 of FIG. 8. All of the elements shown in FIG. 9 are illustrated as objects, even though one or more of these elements may be embodied in hardware form or other suitable form known in the art to provide the necessary functions.

Referring to FIG. 9, original image data is presented to an image signal input object 132, which operates to extract the luminance components ($L_I,C_{I1},C_{I2}$) substantially as shown. The two chrominance components are presented to a maximum chroma lookup table object 134, which produces the value for the chroma-maximized luminance signal ($L_{CM}$). Two low-pass filter objects 136 and 137 eliminate high spatial-frequency components from the two luminance signals, which then are combined in a subtracter 138 after filtering. The color-biased luminance signal $L'_{CB}$ from subtracter 138 is then presented to a display signal output object 140 which combines the image luminance ($L_I$) with the color-biased luminance signal, subject to the effect of a chroma-corrected weight signal (W), to produce the display luminance signal $L_D$. The two chrominance signals ($C_{I1}, C_{I2}$) are presented to a chrominance scaling object 142, which produces the two display chrominance signals ($C_{D1}, C_{D2}$) responsive to the ratio $L_D/L_I$. The three display signals are then recombined at 144 to produce the display image data output.

A chroma correction object 146 employs a number of subobjects to produce the chroma-corrected weight signal (W) responsive to the initial chrominance signals and a threshold signal (T) produced by a threshold selection object 148. Within chroma-correction object 146, a gamut boundary lookup table object 150 produces a gamut error signal $M_E$ representing the out-gamut distance on the chroma magnitude axis of each pixel in the original image. A clipping object 152 eliminates negative values and limits positive values to a threshold value (T) to produce clipped error signal $M_{EC}$, which is then low-pass filtered through a low-pass filter object 154. The chroma correction signal $M_C$ from filter object 154 is then scaled in a scaling object 156 to produce the final chroma-corrected weight signal (W) constrained to the interval [0,1].

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A method for mapping an image from a first color space to a bounded display gamut in a second color space, said first and second color spaces each spanning a plurality of points each having one luminance (L) and two chrominance ($C_1$, $C_2$) values, wherein said two chrominance ($C_1$, $C_2$) values together represent a hue angle (H) value and a chroma magnitude (M) value, said method comprising the steps of:

(a) converting said image into a plurality of signals including an image luminance signal ($L_I$) and two image chrominance signals ($C_{I1}$, $C_{I2}$) that specify image hue angle ($H_I$=arctan $C_{I2}/C_{I1}$) and image chroma magnitude ($M_I$=sqrt ($C^2_{I1}+C^2_{I2}$));

(b) producing a chroma-maximized luminance signal ($L_{CM}$) representing the luminance value of the point on said display gamut boundary having the maximum chroma magnitude ($M_{BX}$) at said image hue angle ($H_I$) value in said second color space;

(c) subtracting said chroma maximized luminance signal ($L_{CM}$) from said image luminance signal ($L_I$) to create a color-biased luminance signal ($L_{CB}=L_I-L_{CM}$);

(d) producing a chroma-corrected weight signal ($0 \leq W < 1$) corresponding to the difference between said image chroma magnitude ($M_I$) and the chroma magnitude ($M_B$) of a first point on said display gamut boundary in said second color space, wherein said chroma-corrected weight signal (W) is zero-valued when $M_B \geq M_I$; and (e) weighting said color-biased luminance signal ($L_{CB}$) and said image luminance signal ($L_I$) according to said chroma-corrected weight signal (W) and combining both to produce a display luminance signal ($L_D = WL_{CB} + (1-W)L_I$ representing the luminance of said mapped image in said second color space.

2. The method of claim 1 wherein said subtracting step comprises the step of:

(c.1) low-pass filtering at least one said luminance signal to remove a plurality of high spatial-frequency components from said color-biased luminance signal ($L_{CB}$).

3. The method of claim 2 wherein said producing step (d) comprises the steps of:

(d.1) subtracting, from said image chroma magnitude ($M_I$), said chroma magnitude ($M_B$) of said first point on said display gamut boundary in said second color space to produce a gamut error signal ($M_E = M_I - M_B$);

(d.2) clipping said gamut error signal ($M_E$) to produce a clipped error signal ($M_{EC}$=[0, T]) having a minimum value of zero and a maximum value equal to a predetermined threshold (T);

(d.3) low-pass filtering said clipped error signal ($M_{EC}$) to produce a chroma correction signal ($M_C$) representing the low spatial-frequency components of said clipped error signal ($M_{EC}$); and (d.4) scaling said chroma correction signal ($M_C$) to produce said chroma-corrected weight signal ($0 \leq W < 1$).

4. The method of claim 4 further comprising the step of:

(f) scaling said image luminance signals ($C_{I1}$, $C_{I2}$) responsive to said display luminance signal ($L_D$) to produce two display chrominance signals ($C_{D1}, C_{D2}$) representing the chrominance of said mapped image in said second color space.

5. The method of claim 4 wherein each said image chrominance signal ($C_{I1}$, $C_{I2}$) is scaled proportionately to changes in said image luminance signal ($L_I$) such that $C_{Di} = C_{Ii} L_D/L_I$ for i=1 and 2.

6. The method of claim 1 wherein said first point on said display gamut boundary has a luminance value equivalent to said image luminance signal ($L_I$) and a hue angle value equivalent to said image hue angle ($H_I$).

7. The method of claim 1 further comprising the step of:

(f) scaling said image chrominance signals ($C_{I1}$, $C_{I2}$) responsive to said display luminance signal ($L_D$) to produce two display chrominance signals ($C_{D1}, C_{D2}$) representing the chrominance of said mapped image in said second color space.

8. The method of claim 1 wherein said producing step (d) comprises the steps of:

(d.1) subtracting, from said image chroma magnitude ($M_I$), said chroma magnitude ($M_B$) of said first point of said display gamut boundary in said second color space to produce a gamut error signal ($M_E = M_I - M_B$);

(d.2) clipping said gamut error signal ($M_E$) to produce a clipped error signal ($M_{EC}$=[0,T]) having a minimum value of zero and a maximum value equal to a predetermined threshold (T);

(d.3) low-pass filtering said clipped error signal ($M_{EC}$) to produce a chroma correction signal ($M_C$) representing the low spatial-frequency components of said clipped error signal ($M_{EC}$); and (d.4) scaling said chroma correction signal ($M_C$) to produce said chroma-corrected weight signal ($0 \leq W < 1$).

9. An image display system for rendering digital images in visible form by mapping said image from a first color space to a bounded display gamut in a second color space, said first and second color spaces each spanning a plurality of points each having one luminance (L) and two chrominance ($C_1$, $C_2$) values, wherein said two chrominance ($C_1$, $C_2$) values together represent a hue angle (H) value and a chroma magnitude (M) value, said system comprising:

image signal input means for conveying said image into a plurality of signals including an image luminance signal ($L_I$) and two image chrominance signals ($C_{I1}$, $C_{I2}$) that specify image hue angle ($H_I$ = arctan $C_{I2}/C_{I1}$) and image chroma magnitude ($M_I$ = sqrt ($C^2_{I1} + C^2_{I2}$));

first lookup table means coupled to said image signal input means for producing a chroma-maximized luminance signal ($L_{CM}$) representing the luminance value of the point on said display gamut boundary having the maximum chroma magnitude ($M_{BX}$) at said image hue angle ($H_I$) value in said second color space;

subtractor means coupled to said first lookup table means and said image signal input means for subtracting said chroma-maximized luminance signal ($L_{CM}$) from said image luminance signal ($L_I$) to create a color-biased luminance signal ($L_{CB} = L_I - L_{CM}$);

chroma correction means coupled to said image signal input means and said first lookup table means for producing a chroma-corrected weight signal ($0 \leq W < 1$) corresponding to the difference between said image chroma magnitude ($M_I$) and the chroma magnitude ($M_B$) of a first point on said display gamut boundary in said second color space, wherein said chroma-corrected weight signal (W) is zero-valued when $M_B \geq M_I$; and display signal output means coupled to said chroma correction means and said subtractor means for weighting said color-biased luminance signal ($L_{CB}$) and said image luminance signal ($L_I$) according to said chroma-corrected weight signal (W) and combining both to produce a display luminance signal ($L_D = WL_{CB} + (1-W)L_I$) representing the luminance of said mapped image in said second color space.

10. The system of claim 9 further comprising:
first low-pass filter means coupled to said subtractor means for filtering at least one said luminance signal to remove a plurality of high spatial-frequency components from said color-biased luminance signal ($L_{CB}$).

11. The system of claim 10 wherein said chroma-correction means comprises:
second lookup table means for producing a gamut error signal ($M_E = M_I - M_B$) representing the difference between said image chroma magnitude ($M_I$) and said chroma magnitude ($M_B$) of said first point on said display gamut boundary in said second color space;

clipper means coupled to said second lookup table means for clipping said gamut error signal ($M_E$) to produce a clipped error signal ($M_{EC} = [0, T]$) having a minimum value of zero and a maximum value equal to a predetermined threshold (T);

second low-pass filter means coupled to said clipper means for filtering said clipped error signal ($M_{EC}$) to produce a chroma correction signal ($M_C$) representing the low spatial-frequency components of said clipped error signal ($M_{EC}$); and scaling means coupled to said second low-pass filter means for scaling said chroma correction signal ($M_C$) to produce said chroma-corrected weight signal ($0 \leq W < 1$).

12. The system of claim 11 further comprising:
chrominance scaling means coupled to said image signal input means and said display signal output means for scaling said image chrominance signals responsive to said display luminance signal ($L_D$) to produce two display chrominance signals ($C_{D1}$, $C_{D2}$) representing the chrominance of said mapped image in said second color space.

13. The system of claim 12 wherein said chrominance scaling means produces said display chrominance signals ($C_{D1}$, $C_{D2}$) such that each said image chrominance signal ($C_{I1}$, $C_{I2}$) is scaled proportionately to changes in said image luminance signal ($L_I$) such that $C_{Di} = C_{Ii} L_D/L_I$ for i=1 and 2.

14. The system of claim 9 further comprising:
chrominance scaling means coupled to said image signal input means and said display signal output means for scaling said image chrominance signals responsive to said display luminance signal ($L_D$) to produce two display chrominance signals ($C_{D1}$, $C_{D2}$) representing the chrominance of said mapped image in said second color space.

15. The system of claim 9 wherein said first point on said display gamut boundary has a luminance value equivalent to said image luminance signal ($L_I$) and a hue angle value equivalent to said image hue angle ($H_I$).

16. A color image printing system for printing color images by mapping an original digital image from a first color space to a bounded display gamut in a second color space, said first and second color spaces each spanning a plurality of points having one luminance (L) and two chrominance ($C_1$, $C_2$) values wherein said chrominance ($C_1$, $C_2$) values represent a hue angle (H) value and a chroma magnitude (M) value, said system comprising:

image signal input means for converting said image into a plurality of signals including an image luminance signal ($L_I$) and two image chrominance signals ($C_{I1}$, $C_{I2}$) that specify image hue angle ($H_I$ = arctan $C_{I2}/C_{I1}$) and image chroma magnitude ($M_I$ = sqrt ($C^2_{I1} + C^2_{I2}$)).

first lookup table means coupled to said image signal input means for producing a chroma-maximized luminance signal ($L_{CM}$) representing the luminance value of the point on said display gamut boundary having the maximum chroma magnitude ($M_{BX}$) at said image hue angle ($H_I$) value in said second color space;

subtractor means coupled to said first lookup table means and said image signal input means for subtracting said chroma-maximized luminance signal ($L_{CM}$) from said image luminance signal ($L_I$) to create a color-biased luminance signal ($L_{CB} = L_I - L_{CM}$);

chroma correction means coupled to said image signal input means and said first lookup table means for producing a chroma-corrected weight signal ($0 \leq W < 1$) corresponding to the difference between said image chroma magnitude ($M_I$) and the chroma magnitude ($M_B$) of a first point on said display gamut boundary in said second color space, wherein said chroma-corrected weight signal (W) is zero-valued when $M_B \geq M_I$; and display signal output means coupled to said chroma correction means and said subtractor means for combining said color-biased luminance signal ($L_{CB}$) and said image luminance signal ($L_I$) according to said chroma-corrected weight signal (W) and combining both to produce a display luminance signal ($L_D = WL_{CB} + (1-W)L_I$) representing the luminance of said mapped image in said second color space.

17. The system of claim 16 further comprising:

first low-pass filter means coupled to said subtractor means for filtering at least one said luminance signal to remove a plurality of high spatial-frequency components from said color-biased luminance signal ($L_{CB}$).

18. The system of claim 17 wherein said chroma-correction means comprises:

second lookup table means for producing a gamut error signal ($M_E = M_I - M_B$) representing the difference between said image chroma magnitude ($M_I$) and said chroma magnitude ($M_B$) of said first point on said display gamut boundary in said second color space;

clipper means coupled to said second lookup table means for clipping said gamut error signal ($M_E$) to produce a clipped error signal ($M_{EC} = [0, T]$) having a minimum value of zero and a maximum value equal to a predetermined threshold (T);

second low-pass filter means coupled to said clipper means for filtering said clipped error signal ($M_{EC}$) to produce a chroma correction signal ($M_C$) representing the low spatial-frequency components of said clipped error signal ($M_{EC}$); and scaling means coupled to said second low-pass filter means for scaling said chroma correction signal ($M_C$) to produce said chroma-corrected weight signal ($0 \leq W < 1$).

19. The system of claim 18 further comprising:

chrominance scaling means coupled to said image signal input means and said display signal output means for scaling said image chrominance signals responsive to said display luminance signal ($L_D$) to produce two display chrominance signals ($C_{D1}$, $C_{D2}$) representing the chrominance of said mapped image in said second color space.

20. The system of claim 19 wherein said chrominance scaling means produces said display chrominance signals ($C_{D1}$, $C_{D2}$) such that each said image chrominance signal ($C_{I1}$, $C_{I2}$) is scaled proportionately to changes in said image luminance signal ($L_I$) such that $C_{Di} = C_{Ii} L_D/L_I$ for $i = 1$ and 2.

21. The system of claim 16 further comprising:

chrominance scaling means coupled to said image signal input means and said display signal output means for scaling said image chrominance signals responsive to said display luminance signal ($L_D$) to produce two display chrominance signals ($C_{D1}$, $C_{D2}$) representing the chrominance of said mapped image in said second color space.

22. The system of claim 16 wherein said first point on said display gamut boundary has a luminance value equivalent to said image luminance signal ($L_I$) and a hue angle value equivalent to said image hue angle ($H_I$).

* * * * *

UNITED STATES PATENT AND TRADEMARK OFFICE
CERTIFICATE OF CORRECTION

PATENT NO. : 5,450,216
DATED : September 12, 1995
INVENTOR(S) : James M. Kasson

It is certified that error appears in the above-indentified patent and that said Letters Patent is hereby corrected as shown below:

On the title page: Item [56] add the following additional prior art reference under "OTHER PUBLICATIONS":

J. D. McFall et al., Default RGB Color Palette with Simple Conversion from YUV, IBM Technical Disclosure Bulletin, Vol. 33, No. 5, October 1990, pp. 200-205.

Column 15, line 36 (line 28 of claim 9), change $$"(L_{CB} = L_I L_{CM})" \text{ to } --(L_{CB} = L_I - L_{CM})--$$

Signed and Sealed this

Fifth Day of March, 1996

Attest:

BRUCE LEHMAN

*Attesting Officer*     *Commissioner of Patents and Trademarks*